(12) United States Patent
Hung et al.

(10) Patent No.: US 11,892,647 B2
(45) Date of Patent: Feb. 6, 2024

(54) HEAD MOUNTABLE DEVICE WITH TRACKING FEATURE

(71) Applicant: Hewlett-Packard Development Company, L.P., Spring, TX (US)

(72) Inventors: Yew-Chung Hung, Taipei (TW); Kuan-Lin Li, Taipei (TW); Jen-Chun Hsu, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/043,783

(22) PCT Filed: Sep. 28, 2020

(86) PCT No.: PCT/US2020/053152
§ 371 (c)(1),
(2) Date: Mar. 2, 2023

(87) PCT Pub. No.: WO2022/066188
PCT Pub. Date: Mar. 31, 2022

(65) Prior Publication Data
US 2023/0288710 A1    Sep. 14, 2023

(51) Int. Cl.
*G02B 27/01*    (2006.01)
*G02B 27/00*    (2006.01)
*G06T 7/579*    (2017.01)

(52) U.S. Cl.
CPC ..... *G02B 27/0176* (2013.01); *G02B 27/0093* (2013.01); *G02B 27/0101* (2013.01); *G02B 2027/014* (2013.01); *G02B 2027/0138* (2013.01); *G06T 7/579* (2017.01)

(58) Field of Classification Search
CPC ............ G02B 27/0176; G02B 27/0172; G02B 27/0093; G02B 2027/0138; G06T 7/579
See application file for complete search history.

(56) References Cited

U.S. PATENT DOCUMENTS

| 6,369,952 | B1 | 4/2002 | Rallison et al. |
| 9,619,201 | B2 | 4/2017 | Jannard et al. |
| 9,990,777 | B2 | 6/2018 | Bradski |
| 10,008,028 | B2 | 6/2018 | Zuccarino et al. |
| 10,616,563 | B2 | 4/2020 | Taylor et al. |
| 10,684,654 | B2 | 6/2020 | Shin et al. |

(Continued)

FOREIGN PATENT DOCUMENTS

| WO | 2017/117675 A1 | 7/2017 | |
| WO | 2020/014705 A1 | 1/2020 | |
| WO | WO-2020129029 A2 * | 6/2020 | ............. G06F 3/011 |

*Primary Examiner* — Xuemei Zheng
(74) *Attorney, Agent, or Firm* — Quarles & Brady LLP (57) ABSTRACT

Various examples described herein relate to an HMD which comprises an HMD body positioned against a face of a user which includes an IMU to track user location data in an environment. The HMD also comprises a detachable headband assembly including a tracking feature module to construct a map of the environment based on the user location data. The HMD further includes a mechanical mount feature attaching the detachable headband assembly to the HMD body. The mechanical mount feature includes a connection interface to exchange the user location data between the IMU in the HMD body and the tracking feature module in the detachable headband assembly.

15 Claims, 6 Drawing Sheets

(56) References Cited

U.S. PATENT DOCUMENTS

| | | | |
|---|---|---|---|
| 2002/0163486 A1 | 11/2002 | Ronzani et al. | |
| 2016/0212888 A1* | 7/2016 | Nikkhoo | G02B 7/008 |
| 2018/0108149 A1* | 4/2018 | Levinshtein | G06T 7/246 |
| 2018/0348529 A1* | 12/2018 | Blum | G06T 19/006 |
| 2019/0079302 A1 | 3/2019 | Ninan et al. | |
| 2019/0339736 A1 | 11/2019 | Chang et al. | |

* cited by examiner

HEAD MOUNTABLE DEVICE WITH TRACKING FEATURE

BACKGROUND

Enhanced reality systems allow a user to become immersed in an enhanced reality environment wherein they can interact with the enhanced environment. Extended reality (XR) technologies include virtual reality (VR), augmented reality (AR), and mixed reality (MR) technologies. XR technologies may use head mounted display (HMDs). An HMD is a display/audio device that may be worn on the head and allow the user to become immersed in a virtual scene. Such HMDs include enhanced reality applications which can provide visual stimuli, auditory stimuli, track user movement, and other user data to create a rich immersive experience. Some HMDs may include tracking features which track a user's location in an environment.

BRIEF DESCRIPTION OF THE DRAWINGS

Many aspects of the disclosure can be better understood with reference to the following drawings. While several examples are described in connection with these drawings, the disclosure is not limited to the examples disclosed herein.

DETAILED DESCRIPTION

A head mounted display (HMD) can be employed as an extended reality (XR) technology to extend the reality experienced by the HMD's wearer. An HMD can project images which immerse the wearer of the HMD with virtual reality (VR), augmented reality (AR), mixed reality (MR), or another type of XR technology. An HMD may also include input devices to receive captured user data, such as from sensors, microphones, and cameras. The user data may include user motion data, user orientation data, speed and velocity data, image data, video data, or any other data associated with a user and the user's environment which may be captured using an HMD. An HMD can also include a headband so that the HMD can be securely attached to its wearer's head and thus used in a hands-free manner.

Some HMD devices are used for training purposes. For example, a simultaneous localization and mapping (SLAM) feature module may be implemented for constructing or updating a map of an unknown environment while simultaneously keeping track of a user's location within it. The SLAM feature module may use algorithms to determine locations. The algorithms use data from a variety of sources, such as cameras, sonar sensors, inertial measurement units (IMUs), etc.

The IMUs may be included in an AR device, such as AR glasses which include an AR optical engine. AR optical engines in an AR device are generally light in weight and compact in size. On the other hand, a VR device which includes a tracking feature module, such as a SLAM tracking system, may be heavy and bulky in size. Therefore, implementing a tracking feature module for an HMD with an AR optical engine in an AR glasses may be heavy and inefficient for a user wearing the HMD and a more effective technique for including a tracking feature module is needed.

The HMD may instead utilize a tracking feature module in a detachable head strap device of the HMD. In particular, the HMD may include AR glasses with an IMU which communicates with the tracking feature module in the detachable head strap device. By including the tracking feature module in the detachable head strap of the HMD device, the AR optical engine may be used in the compact AR glasses for AR purposes while the head strap including the tracking feature module may be attached onto the AR glasses for training purposes. Further the weight of the tracking feature module may be more efficiently distributed in the head strap, in contrast to traditional VR devices in which the tracking feature module is implemented in one area of the VR device, such as the front, which makes the VR device heavy and uncomfortable for the user to wear.

Various examples described herein relate to an HMD which comprises an HMD body positioned against a face of a user which includes an IMU to track user location data in an environment. The HMD also comprises a detachable headband assembly including a tracking feature module to construct a map of the environment based on the user location data. The HMD further includes a mechanical mount feature attaching the detachable headband assembly to the HMD body. The mechanical mount feature includes a connection interface to exchange the user location data between the IMU in the HMD body and the tracking feature module in the detachable headband assembly.

In other examples described herein, an AR device which comprises an IMU to track user position data, an optical engine to process the user position data, a mechanical mount feature to attach the AR device to a detachable head strap device, and a communication interface to transfer the user position data to the detachable head strap device, wherein the detachable head strap device includes a tracking feature module for constructing a map of an environment based on the user position data.

In yet another example, a detachable head strap device which comprises a camera to capture image data of an environment, a connection interface to receive the user position data from an IMU in a connectable AR device, and a controller including a SLAM module to process the user position data and the captured image data to construct a map of the environment.

Figure 1A:
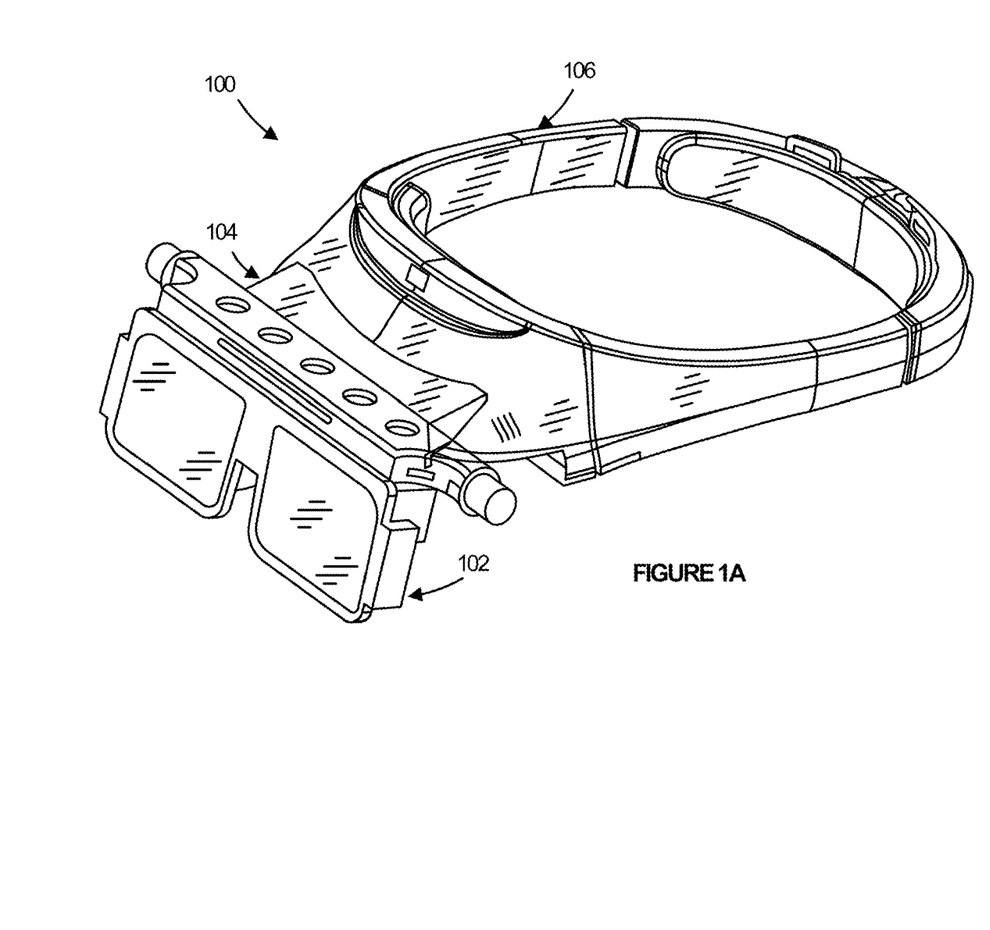
FIG. 1A illustrates a block diagram of a head mounted display (HMD) with an HMD body and a detachable headband with a tracking feature module, according to an example.
Figure 1B:
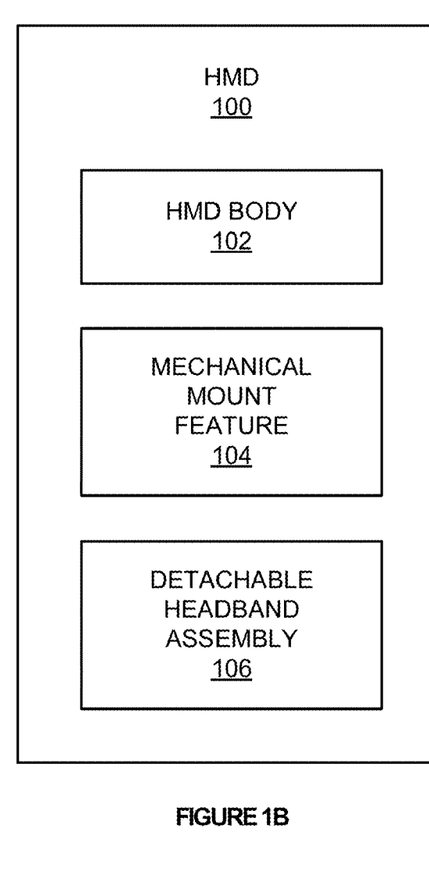
FIG. 1B illustrates a perspective view of an HMD with an HMD body and a detachable headband with a tracking feature module, according to an example.

FIGS. 1A and 1B illustrate a head mounted display (HMD) with an HMD body and a detachable headband with a tracking feature module, according to an example. In particular, FIG. 1A illustrates a block diagram of the HMD with the HMD body and the detachable headband with the tracking feature module, and FIG. 1B illustrates a perspective view of the HMD with the HMD body and the detachable headband with the tracking feature module, according to an example.

The HMD 100 includes an HMD body 102, a mechanical mount feature 104, and a detachable headband assembly 106. The HMD 100 may be used in a training environment, gaming environment, collaboration environment, or any other XR user experience environment. The HMD body 102 can include an optical display that is positioned against a user's face opposite his or her eyes so that the user can view the display internally mounted in the HMD body 102. The HMD body 102 also includes an IMU to track user location data in an environment and an optical engine to process user data (not shown for clarity). The features of the HMD body 102 are further illustrated in FIG. 2A and FIG. 2B.

In some examples, the HMD body 102 may be connected to two temple arms when detached from the detachable headband assembly. In other examples, the HMD 102 may include a printed circuit board assembly (PCBA). The PCBA may be installed on the top of the HMD body 102, such as on the top of the lenses of AR glasses. The PCBA may hold the IMU and a connection interface, such as a universal serial bus (USB) which can communicate with the detachable headband assembly 106 when attached by mechanical mount feature 104. In some cases, the USB connection may comprise a USB 3.1 connector. In yet another scenario, the HMD body 102 may communicate user location/position data with the detachable headband assembly 106 using a USB 3.0 connection. The HMD body 102 may include an optical engine and/or a processing unit, such as a microcontroller unit (MCU).

The mechanical mount feature 104 includes mechanical components which enable the HMD body 102 to attach to the detachable headband assembly 106. In particular, the mechanical mount feature 106 may include latches, fasteners, or any other member which allows the HMD body 102 to be secured to the detachable headband assembly 106. Further, the mechanical mount feature 104 include a connection interface which enables the HMD body 102 to communicate the user location/position data with the detachable headband assembly 106.

The detachable headband assembly 106 may be used to securely attach the HMD 100 to a wearer's head, and thus allow the wearer the user the HMD 100 in a hands-free manner. The detachable headband assembly 106 includes a tracking feature module to track a user location and construct a map of an environment. In some examples, the tracking feature module includes a SLAM module. However, it should be noted that other tracking feature modules may be available. Detachable headband assembly 106 may also include input devices, such as sensors, camera, sonar detectors, etc. In these examples, the tracking feature module in the detachable headband device 106 may use the input device data to construct the map of the environment.

In some examples, the detachable headband may include a USB connector to communicate with the HMD body 102 over the mechanical mount feature 104. In yet another example, the detachable headband assembly 106 may also contain its own IMU and MCU. When the detachable headband assembly 106 and the HMD body 102 are connected over the mechanical mount feature 104, the HMD 100 may be in a training usage mode where the tracking feature module is implemented to construct the map of the environment. When the detachable headband assembly 106 and the HMD body 102 are not connected over the mechanical mount feature 104, the HMD 100 may be in an AR usage mode where the tracking feature module is implemented to provide the user with a virtual environment.

Figure 2A:
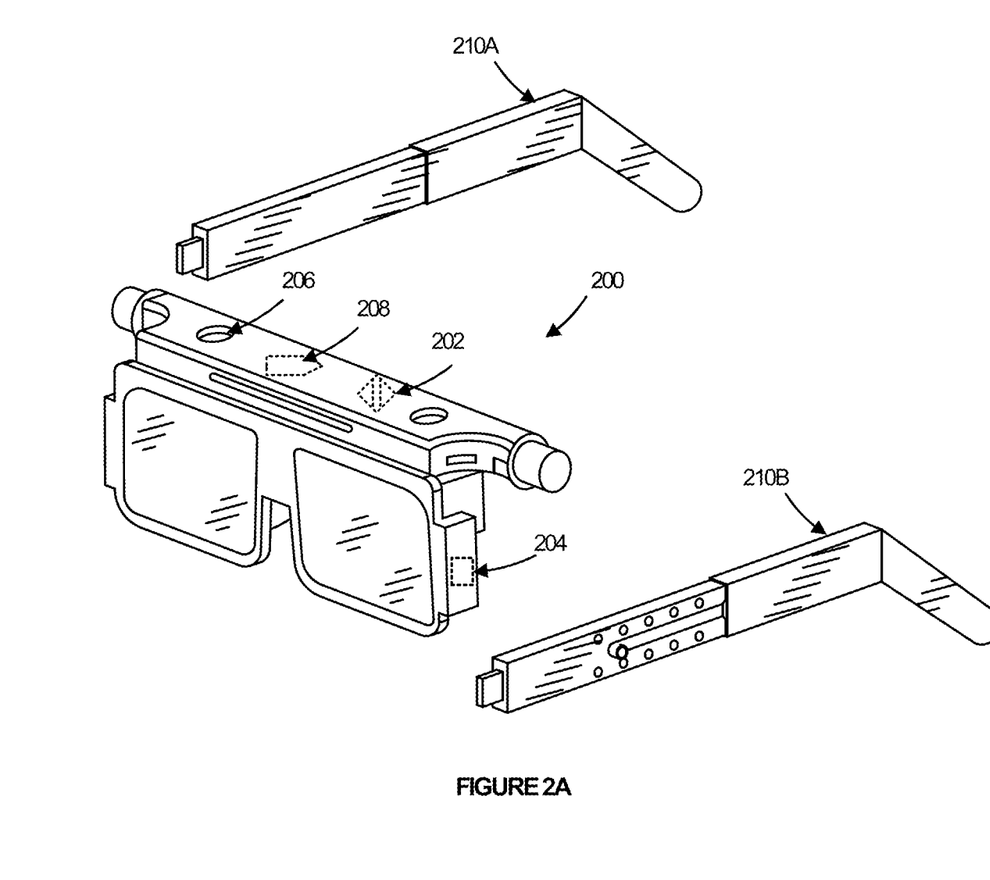
FIG. 2A illustrates a block diagram of an augmented reality (AR) device to exchange user data with a detachable head strap device, according to an example.
Figure 2B:
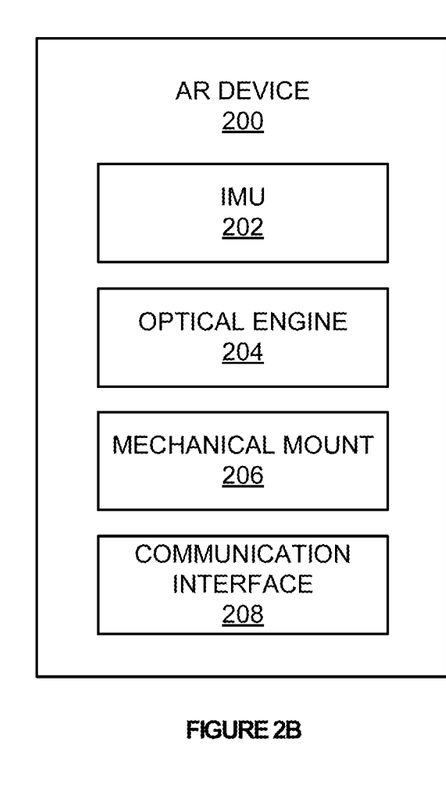
FIG. 2B illustrates a perspective view of an AR device to exchange user data with a detachable head strap device, according to an example.

Turning to FIG. 2A and FIG. 2B, an AR device 200 to exchange user data with a removeable head strap device is illustrated, according to an example. In particular, FIG. 2A illustrates a block diagram of an AR device 200 to exchange user data with a removeable head strap device (not shown for clarity), according to an example; and FIG. 2B illustrates a perspective view of an AR device 200 to exchange user data with a removeable head strap device (not shown for clarity), according to an example.

FIGS. 2A and 2B include an AR device 200. FIG. 2A also illustrates temple arms 210A and 210B which may be connected and disconnected from AR device 200. The AR device 200 may be an example of the HMD body 102 from FIG. 1. However, the AR device 200 and the components included in the AR device 200 may differ in form or structure from the HMD body 102 and the components included in the HMD body 102.

In particular, the AR device 200 includes an IMU 202, an optical engine 204, a mechanical mount 206, and a communication interface 208. The IMU 202 comprises an electronic device that measures and report the user's force, angular rate, orientation, etc. The IMU 202 may include an accelerometer, gyroscope, magnetometers, or any combination thereof to measure and track the user movements. As illustrated in FIG. 2A, the IMU 202 may rest on the top lenses of the AR device 200. In some examples, the IMU 202 may be included in on a PCBA which may be embedded in the AR device 200. In operation, the IMU 202 tracks the user position to generate user position data.

The optical engine 204 comprises an optical setup which includes electronics and controls to support the capture and conversion of received transmission paths. The optical engine 204 may also include an optical bench, and optical, electrical, and/or mechanical input and output interfaces. Referring to FIG. 2A, the optical engine 204 may be located on the side of the AR device 200. However, the optical engine 204 may also be located in other areas of the AR device 200, such as the top of the lenses of AR device 200 and/or on the PCBA with the IMU 202.

The mechanical mount 206 includes mechanical components which enable the AR device 200 to attach to a removeable head strap. In particular, the mechanical mount 206 may include latches, fasteners, or any other member which allows the AR device 200 to be secured to the removeable head strap. It should be noted that when the mechanical mount 206 is not connecting the AR device 200 to the removeable head strap, the AR device 200 may be connected to the two temple arms 210A and 210B. In this example scenario, the AR device 200 may be in an AR usage mode in which the user is experiencing a virtual environment. Conversely, when the mechanical mount 206 is connecting the AR device 200 to the removeable head strap, the AR device 200 may be in a training usage mode in which the user is constructing a map from the user location data generated by the IMU 202.

The communication interface 208 may include communication connections and devices that allow for communication with other computing systems, such as a removeable head strap and/or a host device (not shown), over communication networks (not shown). In particular, the communication interface may transfer the user position data to the removeable head strap, wherein the removeable head strap includes a tracking feature module for constructing a map of an environment based on the user position data.

In some examples, the communication interface 208 may be directed for a target high-end virtual and mixed reality system. For example, a USB type connection may include one or more high speed data traffic lane (i.e., USB 3.0 data traffic lane), and a lower speed data traffic lane (i.e., USB 2.0 data traffic lane). Further in this example, the communication interface 208 may exchange USB 3.0 data with the removeable head strap using a USB 3.0 or a USB 3.1 connection. The connection interface 208 may include a high-speed multiplexing switch that is capable of switching USB 2 D+/D− signals to redirect/convert USB traffic when there is no USB connection, for example when a VIRTUALLINK® protocol is used. Examples of other connections (i.e., non-USB connections) and devices that together allow for inter-system communication may include network interface cards, antennas, power amplifiers, RF circuitry, transceivers, and other communication circuitry.

Although not shown for clarity, the AR device 200 may include a controller, such as an MCU. The MCU may include a processing system and/or memory which store instructions to perform particular functions. As used in the present specification and in the appended claims, the term, "microcontroller" refers to various hardware components, which includes a processor and memory. The controller includes the hardware architecture to retrieve executable code from the memory and execute the executable code. As specific examples, the controller as described herein may include computer-readable storage medium, computer-readable storage medium and a processor, an application-specific integrated circuit (ASIC), a semiconductor-based microprocessor, a central processing unit (CPU), and a field-programmable gate array (FPGA), and/or other hardware device.

The memory may include a computer-readable storage medium, which computer-readable storage medium may contain, or store computer-usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the respective component, cause the component to implement at least the functionality described herein.

Figure 3A:
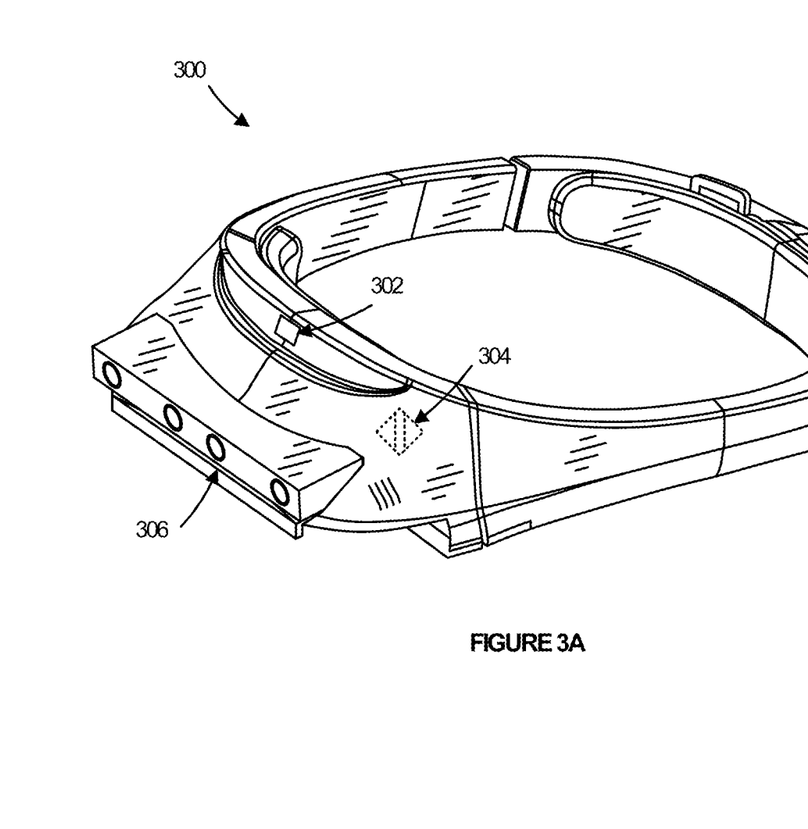
FIG. 3A illustrates a block diagram of a detachable head strap device with a tracking feature module which exchanges user data with an AR device, according to an example.
Figure 3B:
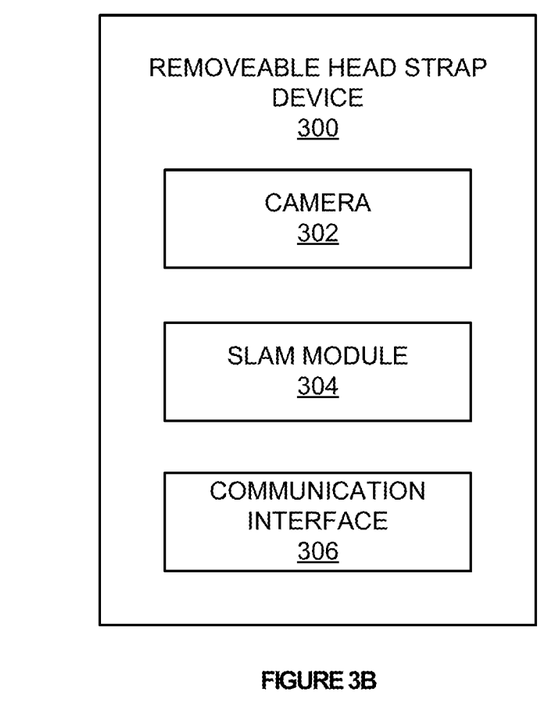
FIG. 3B illustrates a perspective view of a detachable head strap device with a tracking feature module which exchanges user data with an AR device, according to an example.

Turning to FIG. 3A and FIG. 3B, a removeable head strap device 300 with a tracking feature module which exchanges user data with an AR device is illustrated, according to an example. In particular, FIG. 3A illustrates a block diagram of a removeable head strap device with a tracking feature module which exchanges user data with an AR device (not shown for clarity), according to an example; and FIG. 3B illustrates a perspective view of a removeable head strap device with a tracking feature module which exchanges user data with an AR device (not shown for clarity), according to an example.

FIGS. 3A and 3B include a removeable head strap device 300. The removeable head strap device 300 may be an example of the detachable headband assembly 106 from FIG. 1. However, the removeable head strap device 300 and the components included in the removeable head strap device 300 may differ in form or structure from the detachable headband assembly 106 and the components included in the detachable headband assembly 106.

In particular, the removeable head strap device 300 includes a camera 302, a SLAM module 304, and a communication interface 306. The camera may receive image data associated with the user's environment. The camera 302 can be a still image or a moving image (i.e., video) capturing device. Examples of the camera include semiconductor image sensors like charge-coupled device (CCD) image sensors and complementary metal-oxide semiconductor (CMOS) image sensors. Although not shown for clarity, the removeable head strap device 300 may also include other input devices, such as sensors, audio capturing devices, image capturing devices, sonar devices, touch input device, and other comparable devices and associated processing elements capable of receiving inputted user data for the user's environment.

The SLAM module 304 may include computational components which are capable of constructing a map of a user's environment and tracking a user's location within the environment. The SLAM module 304 may construct the map based on user location data received from an IMU located in an AR device, such as AR device 200. The SLAM module 304 may also construct the map based on image data received from camera 302 (in addition to, or in lieu of, the user location data from the IMU). In some examples, the removeable head strap device 300 may also include its own IME, in addition to the IMU located in the AR device, such as AR device 200.

The SLAM module 304 may be executed in a controller, such as an MCU. The MCU may include a processing system and/or memory which store instructions to perform particular functions. The controller includes the hardware architecture to retrieve executable code from the memory and execute the executable code. As specific examples, the controller as described herein may include computer-readable storage medium, computer-readable storage medium and a processor, an application-specific integrated circuit (ASIC), a semiconductor-based microprocessor, a central processing unit (CPU), and a field-programmable gate array (FPGA), and/or other hardware device.

The memory may include a computer-readable storage medium, which computer-readable storage medium may contain, or store computer-usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the respective component, cause the component to implement at least the functionality described herein.

The communication interface 306 may include communication connections and devices that allow for communication with other computing systems, such as an AR device and/or a host computing device (not shown), over communication networks (not shown). In operation, the communication interface 306 may receive user location/position data from an IMU in an AR device, such as AR device 200. The communication interface 306 may be directed for a target high-end virtual and mixed reality system. For example, a USB type connection may include one or more high speed data traffic lane (i.e., USB 3.0 data traffic lane), and a lower speed data traffic lane (i.e., USB 2.0 data traffic lane).

Further in this example, the communication interface 306 may exchange USB data with an AR device using a USB 3.0 channel. Further, the connection interface 306 may include a high-speed multiplexing switch that is capable of switching USB 2 D+/D− signals to redirect/convert USB traffic when there is no USB connection, for example when a VIRTUALLINK® protocol is used. Examples of other connections (i.e., non-USB connections) and devices that together allow for inter-system communication may include network interface cards, antennas, power amplifiers, RF circuitry, transceivers, and other communication circuitry.

Figure 4:
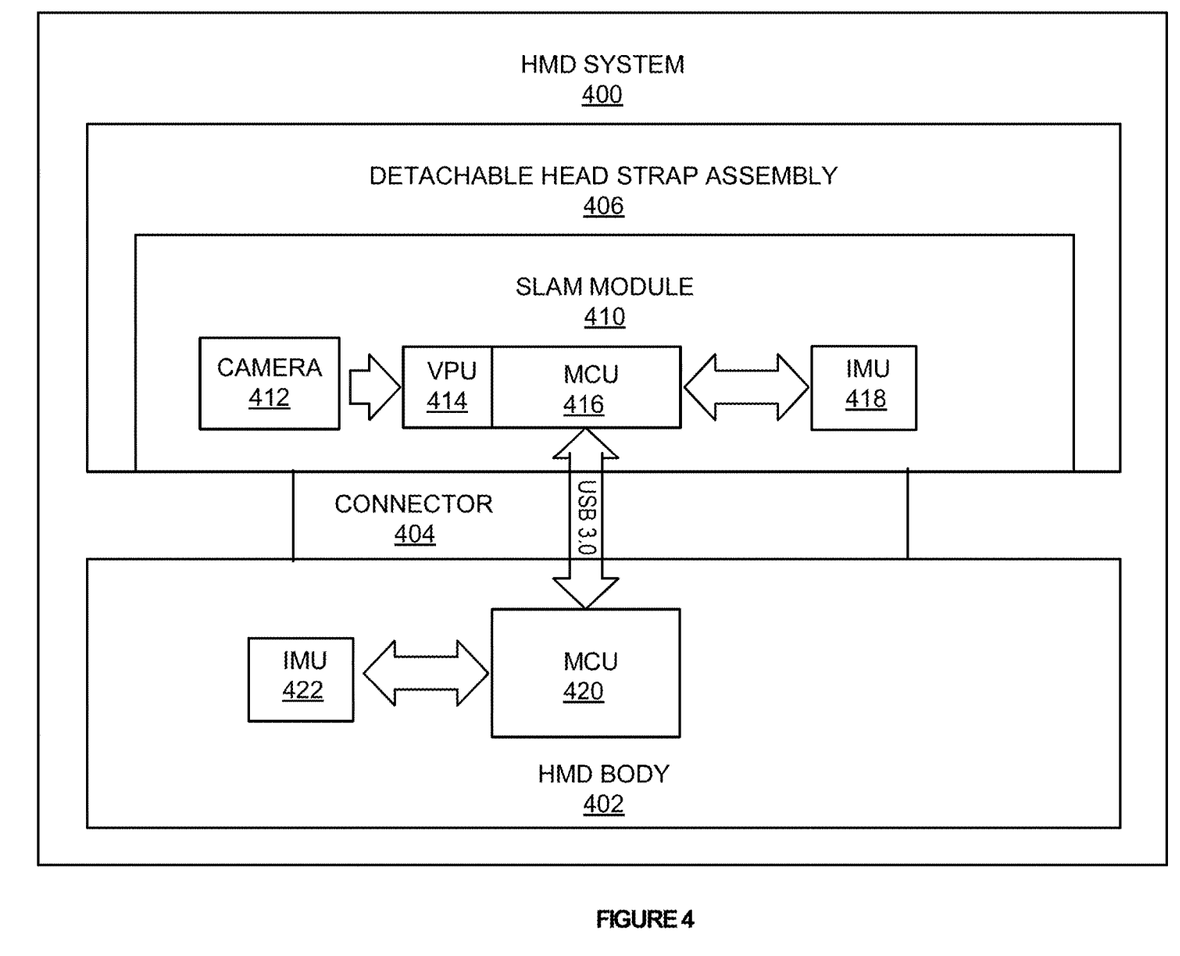
FIG. 4 illustrates a system in an HMD with an AR device and a detachable head strap device with a simultaneous localization and mapping (SLAM) module, according to an example.

FIG. 4 illustrates an HMD system with an AR device and a detachable head strap device with a SLAM module, according to an example. FIG. 4 includes an HMD system 400, an HMD body 402, a connector 404, and a detachable head strap assembly 406. The HMD system 400 may be an example of the HMD 100 from FIG. 1. However, the HMD system 400 and the components included in the HMD system 400 may differ in form or structure from the HMD 100 and the components included therein. It should be noted that in this example scenario, each of HMD body 402 and detachable head strap assembly 406 include an MCU and an IMU. The detachable head strap assembly 406 also includes a SLAM module 410. In particular, the SLAM module 410 includes a camera 412, a visual processing unit (VPU) 414, the MCU 416, the IMU 418.

In operation, the IMU 422 in the HMD body 402 tracks a user's movements and measures the user's velocity, orientation, acceleration, etc. This user location data is then communicated with the MCU 420. The MCU 420 may process the user location data and transfer the user location data to the SLAM module 410 in the detachable head strap assembly 406 over connector 404. As indicated in FIG. 4, the user location data may be transferred to the SLAM module 410 in the detachable head strap assembly over a USB 3.0 connection. In some example, the connector 404 may be a USB 3.1 connector.

Still referring to FIG. 4, the SLAM module 410 may receive the user location data over the connector 404. Furthermore, camera 412 may capture image data of the user's environment and communicate the image data with the MCU 416 in the SLAM module 410 over the VPU 414. The MCU 416 may also receive other user location data from the IMU 418 located in the detachable head strap assembly 406. The MCU 416 may then process the user location data from the IMU 422 in the HMD body 402, the image data from the camera 412, the other user location data from the IMU 418 in the detachable head strap assembly 406, alone or in combination, to construct the map of the user's environment. In some examples, the data may be exchanged with an external device, such as a host device, to construct the map of the user's environment.

Advantageously, the user may user the SLAM module 410 in the detachable head strap assembly 406 for training usages, but then detach the detachable head strap assembly for AR usages. Further, by placing the SLAM module 410 in the detachable head strap assembly 406 (instead of in the HMD body 402), the weight of the HMD system 400 is more efficiently disperse and therefore, more comfortable for the user to wear.

Figure 5A:
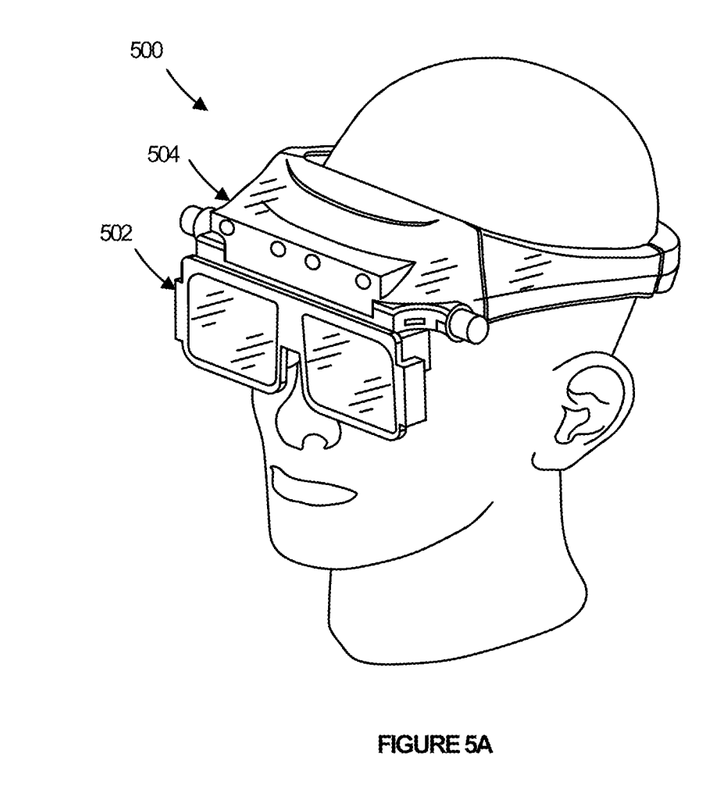
FIG. 5A illustrates an HMD which is in a training usage mode, according to an example.
Figure 5B:
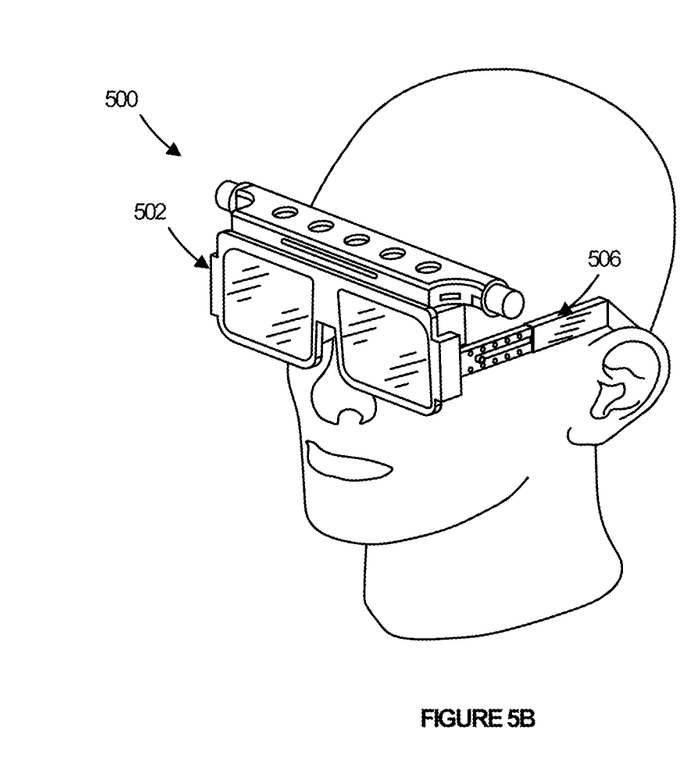
FIG. 5B illustrates an HMD which is in an AR usage mode, according to an example.

FIGS. 5A and 5B illustrate an HMD which can be worn for a training usage mode and an AR usage mode. Specifically, FIG. 5A illustrates an HMD 500 which is in a training usage mode, according to an example; and FIG. 5B illustrates the HMD 500 which is in an AR usage mode, according to an example. The HMD 500 may be an example of the HMD 100 from FIG. 1. However, the HMD 500 and the components included in the HMD 500 may differ in form or structure from the HMD 100 and the components included therein.

Referring to FIG. 5A, the HMD 500 includes an HMD body 502 and a removeable headband 504. Although not show, the HMD body 502 includes an IMU to receive user movement data, and the removeable headband 504 includes a tracking feature module to construct a map of the user's environment. When the user is wearing the HMD 500 with both the HMD body 502 and the removeable headband 504, the HMD 500 is in a training mode. In the training mode, the tracking feature module may be gathering information about the user's environment to construct a map of the environment.

Referring to FIG. 5B, the HMD 500 includes an HMD body 502 and a temple arms 506. When the user is wearing the HMD 500 with the HMD body 502 and the temple arms 506, but without the removeable headband 504, the HMD 500 is in an AR usage mode in which the user is interacting with a virtual environment.

This allows the user to efficiently attach the HMD body 502 to the tracking feature module in the removeable headband 504 when the user is using the tracking feature module, and remove the tracking feature module in the removeable headband 504 when the user is using the HMD 500 for an AR experience. This also allows the tracking feature module to be more compact and the HMD body 502 to be lighter since the tracking feature module is integrated into the removeable headband 504, and not to the HMD body 502.

Figure 6:
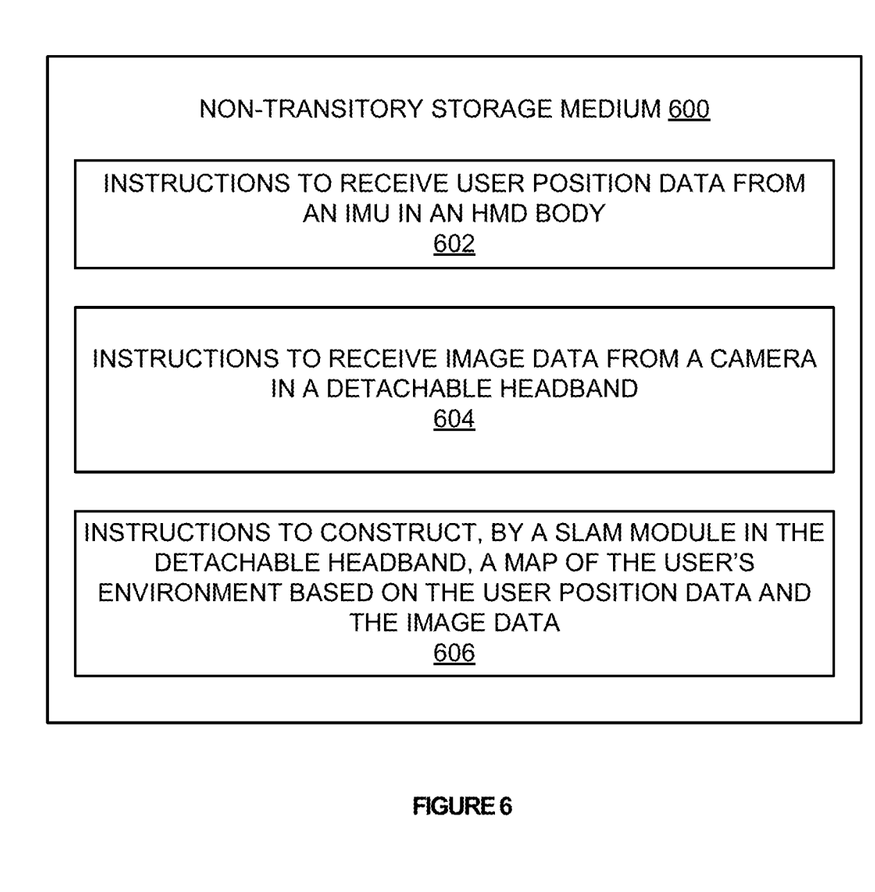
FIG. 6 illustrates a block diagram of a non-transitory readable medium storing machine-readable that upon execution cause a system to direct a detachable head strap device to construct a map of an environment using a tracking feature module, according to another example.

FIG. 6 illustrates a block diagram of a non-transitory readable medium storing machine-readable that upon execution cause a system to direct a detachable head strap device to construct a map of an environment using a tracking feature module, according to another example. Storage medium is non-transitory in the sense that is does not encompass a transitory signal but instead is made up of a memory component configured to store the relevant instructions.

The machine-readable instructions include instructions 602 to receive user position data from an IMU in an HMD body. The machine-readable instructions also include instructions 604 to receive image data from a camera in a detachable headband. Furthermore, the machine-readable instructions also include instructions 606 to construct, by a SLAM module in the detachable headband, a map of the user's environment based on the received user position data and the received image data.

In one example, program instructions 602-606 can be part of an installation package that when installed can be executed by a processor to implement the components of a computing device. In this case, non-transitory storage medium 600 may be a portable medium such as a CD, DVD, or a flash drive. Non-transitory storage medium 600 may also be maintained by a server from which the installation package can be downloaded and installed. In another example, the program instructions may be part of an application or applications already installed. Here, non-transitory storage medium 600 can include integrated memory, such as a hard drive, solid state drive, and the like.

The functional block diagrams, operational scenarios and sequences, and flow diagrams provided in the Figures are representative of example systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. Those skilled in the art will understand and appreciate that a method could alternatively be represented as a series of interrelated states or events, such as in a state diagram. Moreover, not all acts illustrated in a methodology may be included as a novel example.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

What is claimed is:

1. A head mountable display (HMD) comprising:
    an HMD body positioned against a face of a user which includes an inertial measurement unit (IMU) to track user location data in an environment;
    a detachable headband assembly including a tracking feature module to construct a map of the environment based on the user location data; and
    a mechanical mount feature attaching the detachable headband assembly to the HMD body, wherein the mechanical mount feature includes a connection interface to exchange the user location data between the IMU in the HMD body and the tracking feature module in the detachable headband assembly.

2. The HMD of claim 1, wherein the tracking feature module included in the detachable headband comprises a simultaneous localization and mapping (SLAM) module to construct the map of the environment based on the user location data.

3. The HMD of claim 1, wherein the detachable headband assembly further includes a camera to capture image data of the environment, and wherein the tracking feature module constructs the map of the environment based on the user location data and the captured image data.

4. The HMD of claim 1, wherein the HMD body includes a printed circuit board assembly (PCBA) which is coupled to the IMU of the HMD body.

5. The HMD of claim 1, wherein the connection interface included in the mechanical mount feature comprises a universal serial bus (USB) connector.

6. The HMD of claim 1, wherein the HMD is in a training usage mode when the HMD body is attached to the detachable headband assembly by the mechanical mount feature.

7. The HMD of claim 1, wherein the HMD is in an augmented reality (AR) usage mode when the HMD body is detached from the detachable headband assembly.

8. The HMD of claim 1, wherein the HMD body is connected to two temple arms when detached from the detachable headband assembly.

9. The HMD of claim 1, wherein the HMD body and the detachable headband assembly each include a microcontroller unit (MCU) to process the user location data.

10. An augmented reality (AR) device comprising:
    an optical engine;
    an inertial measurement unit (IMU) to measure user position data;
    a mechanical mount feature to attach the AR device to a removeable head strap device; and
    a communication interface to transfer the user position data to the removeable head strap device, wherein the removeable head strap device includes a tracking feature module for constructing a map of a user environment based on the user position data.

11. The AR device of claim 10, wherein the communication interface of the AR device comprises a universal serial bus (USB) 3.1 connector.

12. The AR device of claim 10, wherein the AR device is in a training usage mode when the AR device is attached to the removeable head strap device using the mechanical mount feature.

13. The AR device of claim 10, wherein the AR device is in an AR usage mode when the AR device is detached from the removeable head strap device.

14. The AR device of claim 10, wherein the AR device is connected to two temple arms when detached from the removeable head strap.

15. A removeable head strap device comprising:
    a camera to capture image data of a user environment;
    a connection interface to receive the user position data from an inertial measurement unit (IMU) in a connectable Augmented Reality (AR) device; and
    a simultaneous localization and mapping (SLAM) module to process the user position data and the captured image data to construct a map of the environment.

* * * * *